2,840,499

SOLDERING FLUX

Lester Aronberg, Chicago, Ill.

No Drawing. Application June 2, 1954
Serial No. 434,089

12 Claims. (Cl. 148—23)

My invention relates to soldering fluxes and is particularly concerned with the production of improved soldering fluxes for industrial use in the soldering of aluminum and aluminum base alloys, especially aluminum-silicon alloys such as are used in castings.

The common soldering alloys, such as tin-lead, zinc-tin, copper-zinc, and copper-zinc-tin are conventionally used for soldering on tin, zinc, nickel, copper, and various of their alloys, with the usual soldering fluxes, which comprise zinc chloride, rosin, ammonium chloride, borax, stearin, or mixtures containing the same, the type of flux varying with the nature of the soldering work to be done. In the case of the soldering of aluminum with such soldering alloys as those mentioned above, the usual soldering fluxes are wholly unsatisfactory, since they do not flow freely and are ineffective adequately to loosen and remove or displace oxide particles. In recent years, soldering fluxes have been suggested which perform reasonably effectively on pure aluminum but are unsatisfactory for use on various aluminum alloys, notably aluminum base alloys containing silicon or magnesium or both, such as are conventionally employed in castings.

In accordance with my invention, soldering fluxes have been evolved which are satisfactory for use not only in connection with soldering on the common metals with the aforementioned known soldering alloys but which are especially satisfactory for soldering on aluminum in pure form or in the form of alloys containing silicon, magnesium and/or other alloying elements such as are commonly used in aluminum base casting alloys. The soldering fluxes of my invention contain, as essential ingredients, an organic amine fluoride and an inorganic cobalt compound, especially a cobaltous compound, all as is hereafter explained in detail.

Illustrative examples of organic amine fluorides which are usable in the soldering fluxes of my invention are hydroxylamine fluoride, dodecyl pyridinium fluoride, cetyl pyridinium fluoride, octadecyl pyridinium fluoride, monoethanolamine fluoride, diethanolamine fluoride, triethanolamine fluoride, octyl amine fluoride, dodecyl amine fluoride, myristyl amine fluoride, cetyl amine fluoride, octadecyl amine fluoride, monoisopropanolamine fluoride, triisopropanolamine fluoride, glycerolamine fluoride, ethylene diamine fluoride, diethylenetriamine fluoride, triethylenetetramine fluoride, hydroxy-ethyl ethylenediamine fluoride, 2 - amino - 2 - ethyl - 1,3 - propanediol fluoride; 2 - amino - 1,3 - propanediol fluoride; 2 - amino - 2 - methyl - 1 - propanol fluoride; and compatible mixtures of any two or more thereof. It is particularly advantageous to utilize those organic amine fluorides which are in the form of heavy or viscous liquids of syrup-like consistency and it is likewise desirable that said organic amine fluorides contain an excess of organic amine, for instance, from 10 to 40%, and more advantageously from 20 to 30%, by weight, excess amine over the stoichiometric amount required to form the organic amine fluoride. I have found that monoethanolamine fluoride containing about 25 to 35% excess monoethanolamine is particularly satisfactory and its use in the soldering fluxes of my invention represents a particularly important and preferred embodiment.

Illustrative examples of inorganic cobalt compounds which are usable in the soldering fluxes of my invention in combination with the organic amine fluorides are cobaltous hydroxide, cobaltous chloride, cobaltous fluoride, cobaltous bromide, cobaltous sulfate, cobaltous nitrate, cobaltous ammonium chloride, cobaltous ammonium sulfate, cobaltic chloride, cobaltic hydroxide, cobaltic ammonium chlorides, and compatible mixture of any two or more thereof. Of particular utility are cobaltous chloride and cobaltous hydroxide, the utilization of which, in conjunction with the organic amine fluoride, represents an important embodiment of my invention.

The organic amine fluoride and the inorganic cobalt compound constitute, as stated above, the essential ingredients of the soldering fluxes of my invention. Supplemental ingredients in minor proportions can be added so long, of course, as they do not have an undue adverse effect on the functioning of the fluxes. Compounds, such as cuprous chloride, stannous chloride and manganous chloride, or mixture of two or more thereof, serve advantageously in certain instances to enhance the usefulness of the soldering fluxes.

The proportions of the ingredients are subject to some variations. In general, the organic amine fluoride will be used in a ratio, by weight, of 10 parts to from 1 or preferably 2 to 10 parts of the inorganic cobalt compound and, more advantageously, 10 parts, by weight, of the organic amine fluoride to from 3 to 7 parts of the inorganic cobalt, particularly cobaltous compound. Any additional compounds, such as cuprous chloride, stannous chloride or manganous chloride, will usually not appreciably exceed 1 part, by weight, and will, when utilized, ordinarily be employed in the proportion of 0.5 to 1.2 parts. In terms of percentage, by weight, the soldering fluxes will ordinarily contain from about 50% to about 85% of the organic amine fluoride, from about 5% to about 50%, preferably 10% to 40%, of the cobalt inorganic compound, and from 0% to about 10% of any supplemental compounds such as cuprous chloride, stannous chloride and/or manganous chloride.

The solder fluxes of my invention are advantageously produced and used in the form of liquids or pastes, particularly the latter. In general, they are used as external fluxes although they can, in certain instances, be embodied in drier form in solder wires in the hollow cores thereof.

The following examples are illustrative of soldering fluxes made in accordance with my invention. It will, of course, be appreciated that said examples are not in any way to be construed as limitative since numerous other examples can readily be evolved in the light of the guiding principles and teachings set forth herein. All parts listed are by weight.

Example 1

Monoethanolamine fluoride (containing 30% excess monoethanolamine) _____ 10
Cobaltous chloride ($CoCl_2 \cdot 2H_2O$) _____ 5

Example 2

| | |
|---|---|
| Monoethanolamine fluoride (containing 30% excess monoethanolamine) | 10 |
| Cobaltous hydroxide | 4 |

Example 3

| | |
|---|---|
| Monoethanolamine fluoride (containing 30% excess monoethanolamine) | 10 |
| Cobaltous chloride ($CoCl_2 \cdot 2H_2O$) | 5 |
| Stannous chloride | 1 |

Example 4

| | |
|---|---|
| Cetyl pyridinium fluoride | 10 |
| Cobaltous chloride ($CoCl_2 \cdot 2H_2O$) | 5 |

Example 5

| | |
|---|---|
| Triethanolamine fluoride (containing 20% excess triethanolamine) | 10 |
| Cobaltous ammonium chloride | 5 |
| Manganous chloride | 7 |

Example 6

| | |
|---|---|
| Diethylenetriamine fluoride | 10 |
| Cobaltous ammonium sulfate | 6 |

Example 7

| | |
|---|---|
| Monoisopropanolamine fluoride (containing 25% excess monoisopropanolamine) | 10 |
| Cobaltous chloride ($CoCl_2 \cdot 2H_2O$) | 5 |

Example 8

| | |
|---|---|
| Monoethanolamine fluoride (containing 25% excess monoethanolamine) | 10 |
| Cobaltic chloride | 7 |

Example 9

| | |
|---|---|
| Diethanolamine fluoride (containing 20% excess diethanolamine) | 10 |
| Cobaltic hydroxide | 5 |
| Stannous chloride | 1 |

Example 10

| | |
|---|---|
| Hydroxylamine fluoride | 10 |
| Cobaltous chloride ($CoCl_2 \cdot 2H_2O$) | 5 |

Example 11

| | |
|---|---|
| Monoethanolamine fluoride (containing 30% excess monoethanolamine) | 10 |
| Cobaltous chloride ($CoCl_2 \cdot 2H_2O$) | 5 |
| Stannous chloride | 0.5 |
| Manganous chloride | 0.5 |

Example 12

| | |
|---|---|
| Monoethanolamine fluoride (containing 30% excess monoethanolamine) | 10 |
| Cobaltous chloride ($CoCl_2 \cdot 2H_2O$) | 5 |
| Cuprous chloride | 0.6 |
| Stannous chloride | 0.4 |

Example 13

| | |
|---|---|
| Monoethanolamine fluoride (containing 30% excess monoethanolamine) | 10 |
| Cobaltous chloride ($CoCl_2 \cdot 2H_2O$) | 5 |
| Stannous chloride | 0.4 |
| Cuprous chloride | 0.4 |
| Manganous chloride | 0.4 |

The ingredients are simply mixed together with slight heating if desired to form as reasonably a homogeneous mass as possible. The inorganic cobalt compound may be present in solution or in suspension in the organic amine fluoride. In any event, when the soldering flux is heated in use, during the soldering operation, it flows freely and uniformly. The exact mechanism of the co-action which takes place between the organic amine fluoride and the inorganic cobalt compound, and the mechanism of the action which occurs between said soldering flux ingredients and the solder and metal, particularly aluminum and aluminum-silicon alloys, being soldered have not been determined. However, the result of the practice of my invention is to bring about the significant advantages described hereinabove. It has also been observed that the use of the solder fluxes of my invention, employing conventional tin-lead and tin-antimony solders, serves to improve the functioning of said solders even in the heretofore common environments in which such solders are utilized.

What I claim as new and desire to protect by Letters Patent of the United States is:

1. A soldering flux for use in the soldering of aluminum, said flux consisting essentially of an organic amine fluoride and an inorganic cobalt compound, said ingredients being present in a ratio to each other, by weight, of 10 parts of said fluoride to from 1 to 10 parts of said cobalt compound.

2. A soldering flux for use in the soldering of aluminum, said flux consisting essentially of an organic amine fluoride and an inorganic cobaltous compound, said ingredients being present in a ratio to each other, by weight, of 10 parts of said fluoride to from 1 to 10 parts of said cobaltous compound.

3. A soldering flux for use in the soldering of aluminum, said flux consisting essentially of a syrupy organic amine fluoride and an inorganic cobalt compound, said ingredients being present in a ratio to each other, by weight, of 10 parts of said fluoride to from 2 to 10 parts of said cobalt compound.

4. A soldering flux for use in the soldering of aluminum, said flux consisting essentially of a syrupy organic amine fluoride and an inorganic cobaltous compound, said ingredients being present in a ratio to each other, by weight, of 10 parts of said fluoride to from 2 to 10 parts of said cobalt compound.

5. A soldering flux for use in soldering of aluminum, said flux consisting essentially of an ethanolamine fluoride and cobaltous chloride, said ingredients being present in a ratio to each other, by weight, of 10 parts of the ethanolamine fluoride to from 2 to 10 parts of the cobaltous chloride.

6. A soldering flux for use in soldering of aluminum, said flux consisting essentially of an ethanolamine fluoride and cobaltous chloride, said ingredients being present in a ratio to each other, by weight, of 10 parts of the ethanolamine fluoride to from 3 to 7 parts of the cobaltous chloride, said flux being in the form of a syrupy paste.

7. A soldering flux for use in soldering of aluminum, said flux consisting essentially of an ethanolamine fluoride and cobaltous hydroxide, said ingredients being present in a ratio to each other, by weight, of 10 parts of the ethanolamine fluoride to from 2 to 10 parts of the cobaltous hydroxide, said flux being in the form of a srupy paste.

8. A soldering flux for use in soldering of aluminum, said flux consisting essentially of monoethanolamine fluoride and cobaltous chloride, said ingredients being present in a ratio to each other, by weight, of 10 parts of the monoethanolamine fluoride to from 3 to 7 parts of the cobaltous chloride, said flux being in the form of a syrupy paste.

9. A soldering flux for use in soldering of aluminum, said flux consisting essentially of monoethanolamine fluoride containing from about 10 to about 30% excess monoethanolamine and cobaltous chloride, said ingredients being present in a ratio to each other, by weight, of 10 parts of the monoethanolamine fluoride to from 3 to 7 parts of the cobaltous chloride, said flux being in the form of a syrupy paste.

10. A soldering flux in accordance with claim 1 containing from 0.5 to 1.2 parts of a compound selected from the group consisting of cuprous chloride, stannous chloride and manganous chloride.

11. A soldering flux in accordance with claim 5 containing from 0.5 to 1.2 parts of a compound selected from the group consisting of cuprous chloride, stannous chloride and manganous chloride.

12. A soldering flux in accordance with claim 8 containing from 0.5 to 1.2 parts of a compound selected from the group consisting of cuprous chloride, stannous chloride and manganous chloride.

References Cited in the file of this patent

UNITED STATES PATENTS

| 2,238,068 | Miller | Apr. 15, 1941 |

FOREIGN PATENTS

| 684,081 | Great Britain | Dec. 10, 1952 |
| 684,082 | Great Britain | Dec. 10, 1952 |
| 684,083 | Great Britain | Dec. 10, 1952 |